Sept. 13, 1966   M. N. WEBER   3,272,021
LINEAR ACTUATORS
Filed Aug. 20, 1964
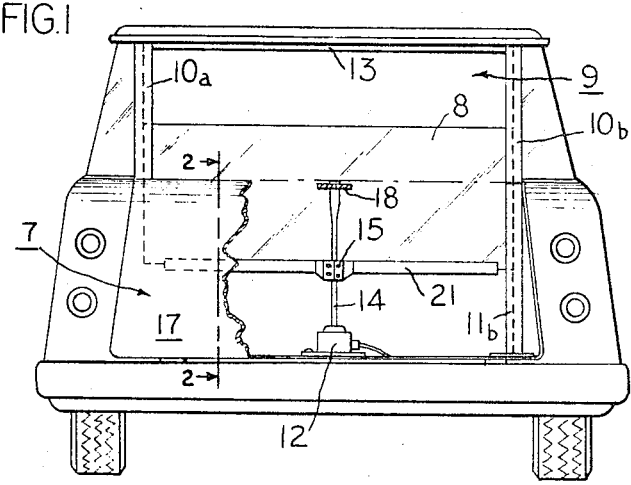
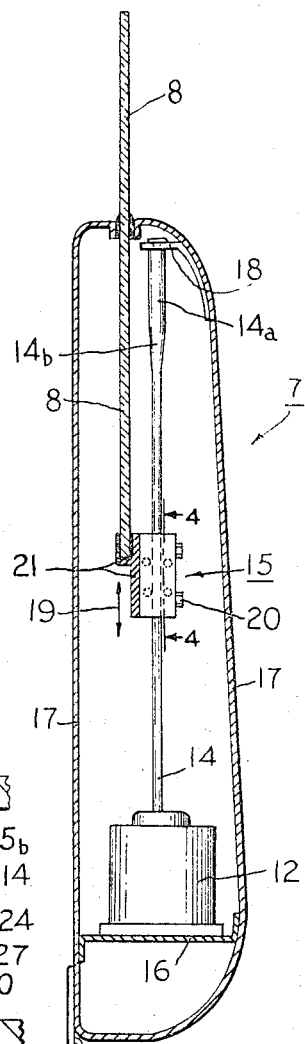
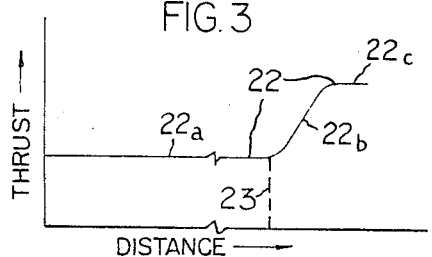
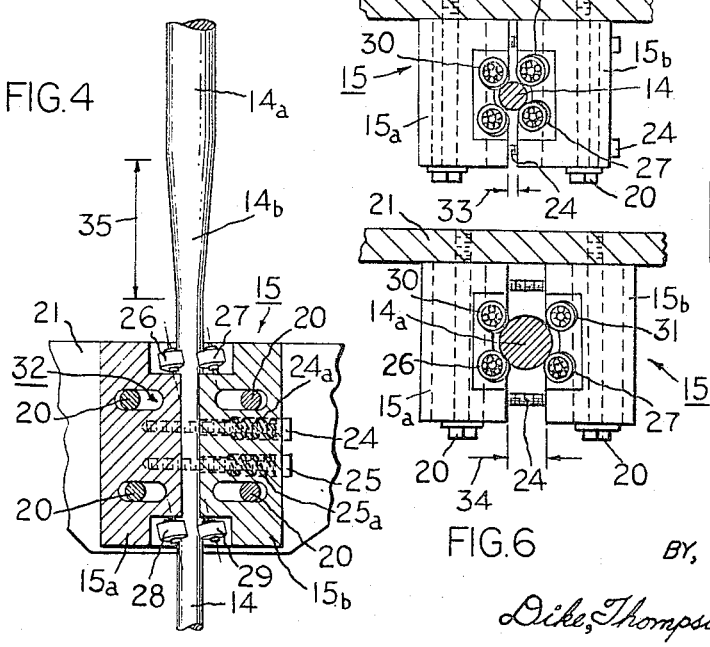
INVENTOR
MILTON N. WEBER
BY
Dike, Thompson, Bronstein & Mrose
ATTORNEYS United States Patent Office 3,272,021
Patented Sept. 13, 1966

3,272,021
LINEAR ACTUATORS
Milton N. Weber, Dearborn, Mich., assignor to Barry Wright Corporation, Watertown, Mass., a corporation of Massachusetts
Filed Aug. 20, 1964, Ser. No. 390,939
13 Claims. (Cl. 74—25)

The present invention relates to improvements in mechanical transducers wherein rotational input movements are translated into rectilinear output movements or stalling forces at prescribed different levels, and, in one particular aspect, to a novel and improved drive mechanism involving an unthreaded shaft in association with a surrounding cluster of inclined rollers having an automatically-induced variable-pressure engagement with the shaft which develops different forces associated with relative motion between the shaft and rollers.

It has been known that a smooth-surfaced rotated shaft engaged by one or more free-running rollers having their axes slightly inclined in relation to the shaft axis will tend to propel the rollers linearly in the direction of the shaft axis, and assemblies of this type have been proposed for such diverse uses as the drive of textile loom shuttles and the actuation of garage door-opening mechanisms. Need for screw-threading is obviated, although at the expense of slippage or stalling when the rollers do not develop a sufficient frictional engagement to overcome the resistance of a driven load.

In accordance with the present teachings, unique operating characteristics of special forms of the shaft-roller type of actuator device are developed for purposes of automatically regulating the output forces which will be produced. It has been established that the thrusts which can be developed by such threadless actuators depends upon the friction forces present at the sites of contact between the shaft and the inclined rollers engage with it; any resistance in excess of the friction forces results in slippage or stalling and terminates the powered rectilinear movements. However, this limiting factor is now uniquely relied upon to enable variable thrusts and stalls to be promoted intentionally and automatically, with highly advantageous results in numerous applications. One preferred construction, characterized by a particularly high degree of mechanical nicety and economy, involves a shaft having different diameters at predetermined positions along its length, the different diameters being merged by gradual tapering, in association with a cluster of spring-biased inclined rollers which automatically engage the exterior shaft surfaces at different friction levels, depending upon the shaft diameters encountered. Different thrust and stall forces are developed when the shaft and rollers are in different relative orientations.

One of the objects of the present invention is to provide novel and improved mechanical transducers for translating rotational forces into rectilinear forces of predetermined variable maximum values.

Another object is to provide precision variable-thrust mechanisms of unique low-cost construction.

A further object is to provide rotary-to-linear drive mechanisms wherein shafts having portions of different diameter therealong automatically occasion different output thrusts and/or speeds and/or stalling forces.

Still further, it is an object to provide novel and improved threadless actuators of economical construction which are particularly suited to use in mechanized closure of windows and the like and which develop different stalling forces over different ranges of operation, to minimize hazards to nearby personnel.

By way of a summary account of practice of this invention in one of its aspects, an electrically-powered window for automotive vehicles includes a reversible electric motor connected in driving relationship to a fixedly positioned rotatable threadless shaft having a relatively small diameter over one portion of its length and merging with a second portion of larger diameter by way of a tapered intermediate portion. A window-driving actuator unit, carrying a cluster of rollers which are inclined in relation to the axis of shaft rotation, is disposed coaxially about the shaft and is provided with springs which urge the inclined rollers into pressurized frictional engagement with the exterior of the shaft; the actuator unit is so constructed that the spring pressures are permitted to vary in accordance with the shaft diameters encountered by the unit in its linear excursions along the shaft. Through proper selection of the orientations and proportions of the different shaft diameters, the window is caused to be powered toward closure under fully fail-safe conditions involving ready slippage of the actuator unit on its drive shaft in the event any obstacle such as a limb of a vehicle occupant is interposed; yet, the closing thrust is materially increased and slippage forces are caused to be significantly higher once the window has closed the associated opening and is to be further seated upwardly and held firmly in the recessed top sealing structure for the window. Similarly, the thrust available for opening the window, against restraints of ice or the like, is desirably high.

Although the aspects of this invention which are believed to be novel are set forth in the appended claims, additional details as to preferred practices of the invention and as to the further objects, advantages and features thereof may be most readily comprehended through reference to the following description taken in connection with the accompanying drawings, wherein:

FIGURE 1 is a pictorial view, from the rear, of an automotive station wagon, in which portions of the tailgate structure are broken away to expose constructional details of an improved automatic window-actuating mechanism embodying teachings of the present invention;

FIGURE 2 provides an enlarged transverse cross-section of the tailgate structure and window-actuating mechanism shown in FIGURE 1, taken along section line 2—2 therein;

FIGURE 3 portrays graphically the variations in output thrust with distance of an associated actuator unit along a drive shaft having portions which are of different diameters;

FIGURE 4 is a cross-sectional view of an improved actuator unit, taken along section line 4—4 in FIGURE 2, together with a portion of the associated threadless drive shaft having portions of different diameters merged by way of a tapered portion;

FIGURE 5 represents a plan view of the assembly appearing in FIGURE 4, with the actuator unit depicted in engagement with the smaller-diameter portion of the drive shaft; and FIGURE 6 is a plan view of the assembly portrayed in FIGURE 4, the actuator unit being shown in engagement with the larger-diameter portion of the drive shaft.

The automotive vehicle illustrated in FIGURE 1 is of a known type including a hinged tailgate 7 from within which an electrically-powered window panel 8 may be raised to close the rear opening 9. Vertical edges of the rectangular glass panel are guided in upper channel portions 10a and 10b which are fixed with the body of the vehicle, and in separate but aligned lower channel portions, such as 11b, mounted within the tailgate structure. Conventional electrical switching (not shown) under supervision of the operator controls excitations of a reversible electric motor 12 to elevate or lower the window to the desired extents. This general form of automatic powered closure is typical of many, such as sliding elevator or household doors, home windows, and the like, which can produce grave accidental bodily injury if limbs are not removed from the path of closure and if the applied power is substantial enough to effect tight closing under the most adverse conditions of use. Auxiliary protective controls tend to be complicated and costly, and preferably should be avoidable.

In the powered mechanism which appears in FIGURES 1 and 2, a highly forceful thrust toward full upward seating is obtained only when the window 8 has been raised sufficiently to essentially close the associated opening 9 and is about to be further elevated into the upper channel member 13 which contains the usual tight sealing and cushioning elements. When in other orientations, the window can slip or stall while exerting thrusts toward closure which are not so great as to inflict serious injury upon any occupant who may become accidentally trapped by it. These desirable characteristics result from the use of the improved actuator mechanism involving a multi-diameter smooth-surfaced drive shaft 14 and a surrounding expansible actuator unit 15 which carries a plurality of inclined rollers. In the illustrated version, the electric drive motor 12, which is supported at a low position on a suitable bracket 16 within the sheet-metal panelling 17 of the tailgate mechanism, is directly connected to the shaft 14 and, in cooperation with an upper guide bracket and bearing 18, supports that threadless shaft for reversible rotation about a normally vertical axis; alternatively, the shaft may be indirectly driven through reduction gearing. Actuator unit 15 is caused to move linearly in the different directions of the longitudinal shaft axis, as represented by arrow symbol 19 in FIGURE 2, whenever the shaft 14 is rotated in one or the other angular direction, and tends to retain its set positions, frictionally. Window 8 follows movements of the actuator unit 15 because of its fixed vertical relationship therewith preserved by bolt connections 20 between that unit and the channel member 21 secured about the lower edge of the window. Throughout most of its length, and except near the very top, shaft 14 is of a first relatively small diameter; however, at its upper end 14a, the drive shaft is tapered up to a substantially larger diameter for purposes of increasing the linear thrusts and stalling forces available when the actuator unit engages that upper end. The resulting operating characteristics are generally like those represented graphically by curve 22 in FIGURE 3, wherein maximum thrust or stalling force appears along the ordinate, and wherein the distance plotted along the abscissa characterizes both distance from the bottom to top of shaft 14 and distance from the lowermost to uppermost positions of the top edge of window 8. Until the actuator unit 15 reaches the tapered portion 14b of shaft 14, at the marked distance 23, the maximum available output thrust is of a substantially fixed level 22a which is low enough to minimize the aforesaid hazards of injury. However, once the uniform-diameter smooth lower portion of the shaft has been traversed by the actuator unit and the tapered portion 14b is reached, the thrust level increases, as designated by rise 22b in the curve 22, and, ultimately, a significantly higher level of thrust 22c is achieved when the actuator unit is fully engaged with the larger diameter end portion 14a of the drive shaft. When the window is to be opened from full closure, a high level of thrust is available also, to break ice formations or overcome other jamming effects.

The cross-sectional view of unit 15 in FIGURE 4 evidences the fact that this actuator unit involves two similar body halves, 15a and 15b, which are secured together on opposite sides of shaft 14 by a plurality of special fasteners such as set screws 24 and 25, each of which is shown to be securely threaded into half 15a and is longitudinally slidable within an enlarged opening in unit half 15b. Coil springs 24a and 25a act continuously to draw the two halves of the unit toward one another and to force their inclined rollers 26–31 into firm frictional engagement with the exterior of the drive shaft between them. The bolts 20 which secure these unit halves to the window member 21 are disposed within laterally-elongated openings, such as opening 32, which provide a needed freedom for lateral movement only, of these halves as the different shaft diameters are encountered. Rollers 26–31 are the six of a total of eight which are visible in the illustrations of FIGURES 4–6, and form two clusters of four rollers about the drive shaft at the upper and lower ends of the actuator unit. Preferably, though not necessarily, all of these rollers are of low-friction ball-bearing types, and all have about the same inclination or skewed relationship to the drive shaft, as established by their central stationary shafts which are pinned to the unit halves. The selected inclination establishes a lead comparable to that of a screw threading and, as is well known, the resulting forces cause the unit 15 to be propelled linearly in directions of the shaft axis, thereby translating rotations of the shaft into rectilinear movements of the actuator unit. FIGURES 4 and 5 make it clear how the unit halves are free to expand and contract in directions laterally of the drive shaft axis, under the resilient restraints imposed by springs such as the coil springs 24a and 25a. The spacing 33 between these halves (FIGURE 4) is relatively small while the smaller-diameter portion of shaft 14 is engaged, and, hence, the restraining springs develop a relatively low level of friction between the rollers and the shaft exterior. A larger spacing 34 is developed when the larger-diameter shaft portion 14a is engaged, and the restraining springs (such as 24a and 25a) are then necessarily further compressed and thereby cause a higher level of pressurized engagement between the rollers and shaft exterior. The increased pressure raises the level of friction which must be overcome to permit slippage or stalling between the actuator unit and shaft in directions of the shaft axis, and, provided the drive motor has the requisite power output capabilities, greater output thrusts can be developed when the larger-diameter shaft portion is seized by the actuator unit (FIGURE 6). In an alternative construction of the actuator unit, the supports for the rollers may be spring-mounted on the body of the unit, to permit their variable-pressure engagements with a variable-diameter shaft without involving a splitting of the roller-supporting body into two halves.

The length 35 of tapered portion 14b, which gradually and smoothly merges the large-diameter end 14a with the smaller-diameter portion of the shaft, is preferably, though not necessarily, selected to permit an even rather than excessively abrupt transition between the different operating states, and to facilitate smooth riding of the actuator unit on the shaft. It should be apparent that, depending upon the needs of various applications, more than two operating states may be developed, or, changes between the different operating states may be effected at various positions along the length of a drive shaft. For these purposes, different shaft diameters need simply be formed at predetermined positions along its length. More than one actuator unit may be associated with one shaft, with the units being arranged to develop thrusts in the same or different directions, or to travel at the same or different speeds. In addition to producing different maximum output thrusts and stalling conditions, the different shaft diameters also cause the output movements to occur at different speeds, under conditions where the drive shaft is rotated at a substantially constant angular rate and the lead angle pre-set into the rollers is unchanged; greater speeds result when larger-diameter portions of the drive shaft are encountered by the actuator unit.

The means for automatically effecting the desired changes in levels of friction which exist between the rollers and the cooperating drive shaft need not be restricted to the specific spring-biasing mechanism chosen for illustration. Leaf springs, magnetic restraints, and the like will also produce useful results, for example. In other versions, different numbers of rollers may be used, and the different shaft diameters may be part of continuously-varying diametric dimensions, as in the case of a shaft having a purely or partly tapered form rather than having different fixed diameters at various positions. Tapering occasions changes in acceleration of the driven unit, and this fact, as well as the aforementioned changes in values of thrust and speed, may also be exploited to advantage. Further, it will be recognized that the functions of the shaft element and the cooperating roller unit may be reversed with equivalent useful results, the roller unit being rotated while the shaft is not.

Accordingly, although the invention has been described in detail with reference to a preferred embodiment and practices, it should be understood that it lends itself to modification, and this application is intended to cover such variations, substitutions, modifications and combinations which follow the principles of the invention as hereinbefore set forth and which fall within the spirit or scope of the invention as expressed by the appended claims.

What I claim as new and desire to secure by Letters Patent of the United States is:

1. Apparatus for translating rotational forces into substantially rectilinear forces at different force levels, comprising a threadless shaft, an actuator unit including roller means in frictional engagement with the exterior of said shaft and rotatable in skewed relationship to the longitudinal axis of said shaft, means producing relative rotation between said shaft and said actuator unit and thereby producing forces therebetween in direction of said axis, and means varying the pressure of frictional engagement between said roller means and shaft in accordance with relative orientations of said actuator unit and shaft along said axis.

2. Apparatus for translating rotational forces into substantially rectilinear forces at different force levels, comprising a threadless shaft, an actuator unit including roller means supported thereon in frictional engagement with the exterior of said shaft and for rotation in skewed relationship to the longitudinal axis of said shaft, motive means producing relative rotation between said shaft and said actuator unit and thereby producing forces therebetween tending to develop relative movement therebetween in directions of said axis, means mounting said roller means on said actuator unit with freedom for movements which vary the pressures of frictional engagements between said roller means and said shaft, and means forcing said roller means into frictional engagements with said shaft which vary in pressure in accordance with predetermined relative orientations of said actuator unit and shaft along said axis, whereby said forces tending to develop relative movement between said actuator unit and shaft vary automatically in accordance with occurrence of said predetermined relative orientations.

3. Apparatus for translating rotational forces into substantially rectilinear forces at different force levels, as set forth in claim 2, wherein said motive means rotates said shaft about said longitudinal axis, and further comprising means guiding said actuator unit for movements in directions of said axis without rotation about said axis.

4. Apparatus for translating rotational forces into substantially rectilinear forces at different force levels, as set forth in claim 2, wherein predetermined portions of said shaft are of different diameters, and wherein said means mounting said roller means includes spring means yieldably urging said roller means into said frictional engagements with said shaft with pressures related to said different diameters of said portions of said shaft engaged by said roller means.

5. Apparatus for translating rotational forces into substantially rectilinear forces at different force levels, comprising a threadless shaft having portions therealong of different diameters, an actuator unit including roller means supported thereon in frictional engagement with the exterior of said shaft and for rotation in skewed relationship to the longitudinal axis of said shaft, said actuator unit including spring means yieldably urging said roller means into frictional engagement with said shaft, motive means producing relative rotation between said shaft and actuator unit about said axis, and means guiding relative substantially rectilinear movements between said actuator unit and said shaft in directions of said axis while preventing rotation of the one of said shaft and actuator unit which is moved by the other along said axis, whereby said substantially rectilinear movements are powered differently in accordance with the engagements of said roller means with said portions of said shaft having said different diameters.

6. Apparatus for translating rotational forces into substantially rectilinear forces at different force levels, comprising a threadless shaft having portions therealong of different diameters, motive means for rotating said shaft about a longitudinal axis, an actuator unit including roller means supported thereon in frictional engagement with the exterior of said shaft and for rotation in skewed relationship to said longitudinal axis, said actuator unit including spring means yieldably urging said roller means into frictional engagement with said shaft, and means guiding said actuator unit for substantially rectilinear movements parallel with said axis and at a predetermined distance therefrom while preventing rotation thereof about said axis, whereby said substantially rectilinear movements of said actuator unit are powered differently in accordance with the engagements of said roller means with said portions of said shaft having said different diameters.

7. Apparatus for translating rotational forces into substantially rectilinear forces at different force levels, as set forth in claim 6, wherein said motive means rotates said shaft at a substantially constant speed, and wherein said roller means comprises a plurality of rollers rotatable about axes which have substantially the same angle of inclination in relation to said longitudinal axis and which lie in planes substantially parallel with said axis.

8. Apparatus for translating rotational forces into substantially rectilinear forces at different force levels, as set forth in claim 6, wherein said portions of said shaft of different diameters include at least two axially-spaced portions of substantially uniform different diameters and a tapered portion therebetween merging the surfaces thereof.

9. Apparatus for translating rotational forces into substantially rectilinear forces at different force levels, comprising a threadless shaft having at least two portions which are of different uniform diameters joined by an intermediate portion which is tapered gradually from one diameter to the other, motive means for selectably rotating said shaft in either direction about said axis at a substantially constant speed, an actuator unit including a plurality of rollers rotatable about axes which have substantially the same angular inclination relative to said shaft axis, means guiding said actuator unit for substantially rectilinear movements in directions of said shaft axis while preventing rotation of said unit about said shaft axis, and spring means yieldably urging said rollers into frictional engagements with the exterior of said shaft with pressures varying in accordance with the diameters of said shaft portions engaged by said rollers.

10. Apparatus for translating rotational forces into substantially rectilinear forces at different force levels, as set forth in claim 9, wherein said actuator unit includes at least two spaced support members disposed at different positions angularly about said shaft, each of said support members mounting different ones of said rollers for rotation with said inclination relative to said shaft axis, and wherein said spring means comprises means yieldably urging said support members inwardly toward said shaft axis.

11. Apparatus for translating rotational forces into substantially rectilinear forces at different force levels, as set forth in claim 10, wherein said actuator unit includes two of said support members disposed on opposite sides of said shaft, and wherein said spring means comprises at least one spring yieldably urging said support members toward one another and thereby pressuring said rollers into said frictional engagements with said shaft.

12. Apparatus for translating rotational forces into substantially rectilinear forces at different force levels, as set forth in claim 11, wherein said guide means comprises an output member, means guiding said output member for linear movements in directions parallel with said shaft axis and in spaced relation thereto, and means mounting said support members on said output member in driving relation thereto and with at least limited freedom for motions in directions transverse to said shaft axis when said support members are differently spaced while in engagement with said shaft portions of said different diameters.

13. Apparatus for translating rotational forces into substantially rectilinear forces at different force levels, as set forth in claim 9, wherein said motive means comprises a reversible electric motor, and further comprising slidable closure means for an opening, means connecting said actuator unit in driving relationship to said closure means, and means supporting said shaft for rotation with a first portion of relatively small diameter in frictional engagement with said rollers while said actuator unit drives said closure means toward closure of the opening and with a second portion of relatively large diameter in frictional engagement with said rollers while said actuator unit drives said closure means beyond the position at which the opening is just closed.

References Cited by the Examiner

UNITED STATES PATENTS

| | | | |
|---|---|---|---|
| 2,204,638 | 6/1940 | Weathers | 74—25 |
| 2,382,105 | 8/1945 | Sarver | 74—25 |

FRED C. MATTERN, Jr., *Primary Examiner.*

F. E. BAKER, *Assistant Examiner.*